Figure 1:
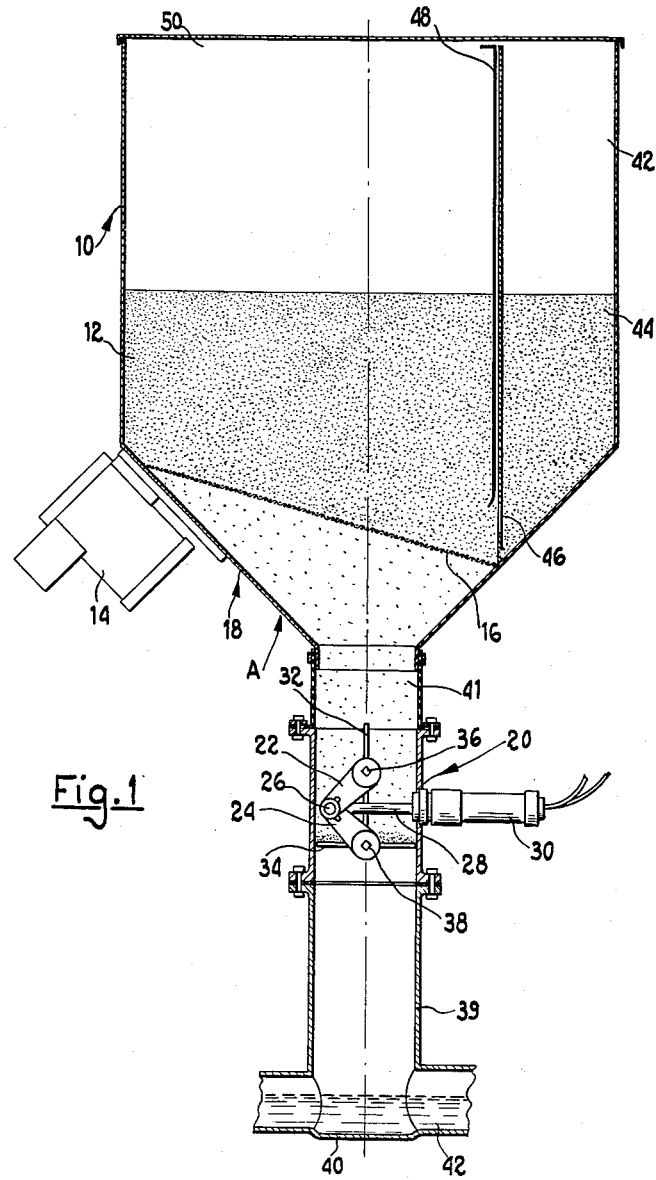

Jan. 28, 1964  G. MAESTRELLI  3,119,529
FILTER POWDER METERING UNIT
Filed July 20, 1961  2 Sheets-Sheet 1

INVENTOR.
Gino Maestrelli
BY
Wenderoth, Lind & Ponack
Attorneys

Jan. 28, 1964  G. MAESTRELLI  3,119,529
FILTER POWDER METERING UNIT
Filed July 20, 1961  2 Sheets-Sheet 2

INVENTOR.
Gino Maestrelli
BY
Wenderoth, Lind & Ponack
Attorneys

United States Patent Office 3,119,529
Patented Jan. 28, 1964

3,119,529
FILTER POWDER METERING UNIT
Gino Maestrelli, 55 Via B. Quaranta, Milan, Italy
Filed July 20, 1961, Ser. No. 125,594
Claims priority, application Italy Apr. 27, 1961
5 Claims. (Cl. 222—145)

It is known that in dry cleaning installations for fabrics or the like the solvent used in cleaning must continuously be purified by removing the dirt and oily, fatty and greasy substances which are detached from the material cleaned in the hopper, chest, or drum of the dry cleaning machines, otherwise simply placing the materials inside the bath of solvent would prove ineffective for the purpose of cleaning. The desired effect is attained by continually renewing the solvent in the hopper, chest or drum during the entire cleaning period (which lasts approximately from 10 to 15 minutes), that is, making said solvent circulate with the help of a pump through a filter capable of holding all of the impurities contained in the solvent inside its filter element, returning the solvent to the dry cleaning machine in such condition as to be able to remove additional dirt and filth from the material being treated.

It is also known that the best and most practical subdivision or breakdown of the dirt deposited in layers on the filter cloth or panel takes place when the filter powder arrives at the filter together with the first few litres of solvent entering the filter, coming in contact with the filter cloth, or other material serving the purpose in such a way as to create a uniform layer having a certain depth or thickness over the entire surface of the filter element, on which the oily, fatty and greasy part of the solvent will collect, thereby constituting the true filter panel which, at the same time, prevents the greasy substances from ruining the filter cloth itself and being deposited thereon.

In the non-automatic machines the metering of these powders was up to now left in the hands of an expert operator whose presence was indispensable to good operation of the dry cleaning installation, thus requiring a considerable increase in operating costs, without, however, giving any certainty that the metering of filter powders would be constant, for all those reasons associated with dependence on human effort, such as distractions, fatigue, or other.

A filter material often used is diatomaceous earth or fossil meal wich is made up of silicon dioxide which constitutes the skeleton of diatomaceous micro-organism; this powder is very fine, being on the order of from 5 to 20 microns and its bulk weight is about 250 grams per dcm.$^3$. A material having the above characteristics is difficult to deal with given the fact that gravity alone is not sufficient to make the powder go down from the tank into the metering unit. This gives rise to another factor of uncertainty in uniformly metering the filtering material, since said metering, dependent also on the subjective evaluation on the part of the operator, is further jeopardized by the trouble connected with the falling of the powder. The invention embodied herein solves this problem and provides a remedy for this disadvantage. as it concerns a device which, in addition to guaranteeing always the same, uniform amount of metering of the filter powder, releasing the dependence of the filtering operation on an expert operator and thus making it possible to lower the operating cost of the dry cleaning installation, especially when said installation is equipped to operate automatically by coin, slug or token.

Figure 2:
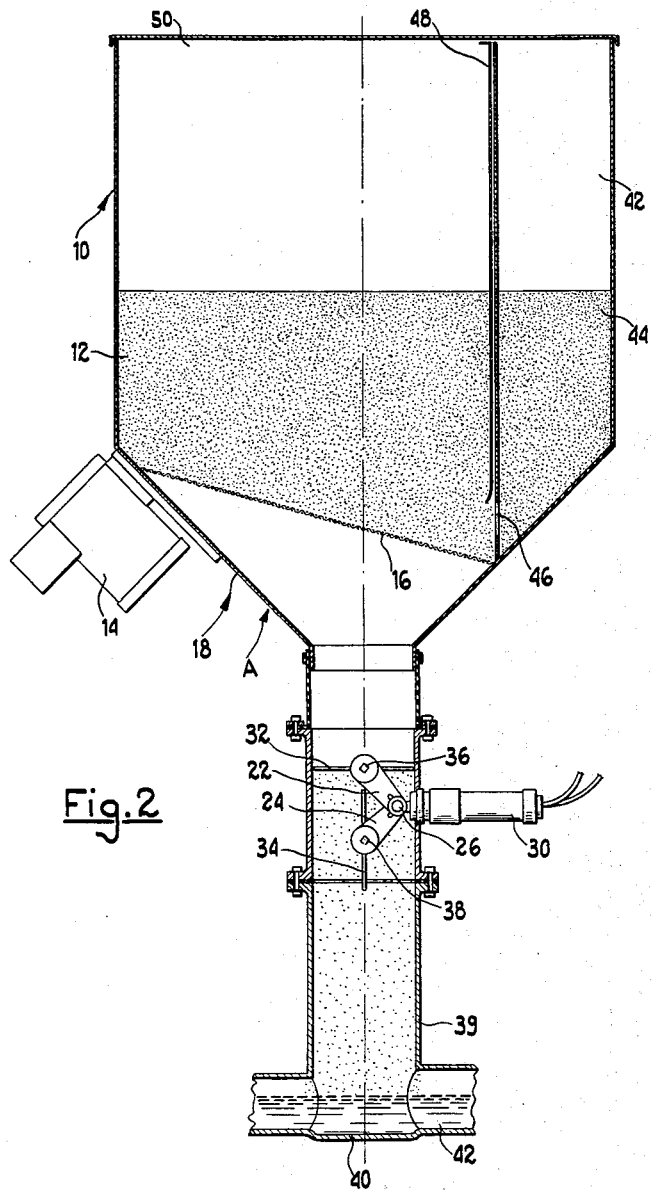

This invention is also capable of using filter materials which are difficult to handle and deal with, such as diatomaceous earth, as it provides for the installation of special devices, such as a vibrator and an expanded metal screen with large, open network which overcomes the trouble connected with the falling of the filter material and the danger such material may become packed in the bin which constitutes the hopper. This is all achieved by means of a hopper which contains a supply of powder, which, by means of a vibrator, fixed to a wide-opening expanded metal screen which holds up the powder, discharges the filter material towards a metering unit comprising a pair of butterfly valves; the opening of the butterfly valve located towards the material to be filtered is pneumatically controlled, operating simultaneously with the stopping of the vibrator, while the control for starting up the vibrator occurs simultaneously with the opening of the valve connected with the hopper, which is also operated pneumatically. The time during which the vibrator is in operation during the cycle of operation of the equipment can be preset, thus guaranteeing perfect metering of the filter powder. One further possibility consists in separating the hopper into one or more compartments in such a way as to be able to mix different kinds of powders. An example of a practical embodiment of the invention illustrative and non-restrictive of same, is given in the accompanying drawings, wherein:

FIG. 1 shows the apparatus in the vibrator-operating phase with the butterfly valve closed which is turned towards the material to be filtered;

FIG. 2 shows the apparatus in a successive phase when the vibrator is stopped, the butterfly valve, turned towards the hopper, is shut and the metered quantity of filtering material is discharged into the space where it comes in contact with the material to be filtered. Device A consists of a hopper 10 holding the filtering material 12 which has a vibrator 14 applied to it, said vibrator being fixed to a taut screen 16 which feeds into hopper 18.

The hopper is applied flexibly to butterfly metering unit 20 which carries pivoted levers 22 and 24, with play along their longitudinal axis through pin 26, pivoting on rod or stem 28 of a piston seated in air cylinder 30. Levers 22—24 are both fixed respectively to butterfly valves 32 and 34, which, upon being actuated are made to rotate together with their small shafts 36 and 38, the ends of which are seated in seats provided for them in the walls of the butterfly meter 20. Underneath the metering unit 20 the discharge tube 39 is located, said tube having a seat 40 where the filtering material 12 comes in contact with the material to be filtered 42, the latter being composed, in this case, of a current of dirty solvent. The example given in FIGS. 1 and 2 provides that the hopper 10 be subdivided into two compartments 42 and 50, in which compartment 42 can hold a different powder 44 communicating with powder 12 by way of a hole 46 which is closed by actuating gate 48. With a single impulse the vibrator 14 is made to start up and the piston held in air cylinder 30 is made to move, which, by means of its rod or stem 28 causes valve 34 to close and valve 32 to open at the same time as shown in FIG. 1. Vibrator 14 causes hopper 10 to vibrate, thus making the filtering material fall through more readily, which, due to its physical properties, has difficulty in falling through by gravity only.

By installing a taut screen having large openings 16 which is fixed to the vibrator, the powder is prevented from being compacted, such powder being, for example, diatomaceous earth, in the area 18 of the hopper which constitutes the actual hopper, considering the fact that screen 16 supports the weight of the powder and allows only a small amount of it to fall through when the vibrator is actuated.

As long as the vibrator is in motion, the powder collects inside the metering unit 20 held by the butterfly valve 34. Afterwards, a single impulse stops the vibrator 14 and causes the valve 34 to open by pneumatic control, this occurring simultaneously with the closing of valve 32 starting the phase shown in FIG. 2. The quantity 41 of powder provided and accumulating between valve 34 and screen 16 thus falls into seat 40 where it comes in contact with the solvent 42 which flows to the filter of the dry cleaning machine concerned.

Device A provides for the use of other compartments besides 10; in the example shown in FIGS. 1 and 2 there is another compartment 42 holding powder 44 which could be active carbon having high decolorant action. The vibration makes it possible for powder 44 to pass through hole 46, getting mixed with powder 12 after which it proceeds exactly as does powder 12. Whenever one wishes to cut out powder 44 from the filtering action, upon actuating gate 48 hole 46 is shut and powder 44 will no longer be mixed with powder 12.

In actual practice the details of construction and operation of the invention can be varied in any way without however falling outside the scope and coverage of said invention and the protection offered by its patent. For example, the hopper or tank could be divided up into more compartments to provide for the mixing of a number of different filter powders having different physical properties.

What I claim is:

1. A metering unit for filter powder, particularly for filtering a solvent in dry cleaning, comprising a container for the filter powder, a metering unit connected to said container, said container having a stretched screen at the bottom thereof, an elastic vessel below said screen in the form of a funnel, a vibrator for oscillating said funnel, said metering unit comprising said elastic vessel and a cylindrical body with which said vessel is flexibly connected, said cylindrical body having an upper rotating wall and a lower rotating wall, a crank to which each wall is connected at one end thereof, a rod on which tion to receive a metered quantity of filter powder with the other ends of said cranks are pivoted, an air cylinder, a piston in said cylinder to which said rod is connected so that when the vibrator is actuated the lower rotating wall takes a horizontal position to closed position the upper rotating wall taking a vertical position to opened position, and that when the vibrator is automatically stopped and the piston in said air cylinder is actuated, the upper wall is closed and the lower wall is opened to release the metered powder quantity.

2. A metering unit as set forth in claim 1 wherein said cylindrical body is connected at its lower end to a support containing the cleaning solvent.

3. A metering unit as set forth in claim 1 wherein said container is divided into compartments to receive filter powders having different physical properties.

4. A metering unit as set forth in claim 3 wherein means are provided for shutting off one of said compartments from said cylindrical body.

5. A metering unit as set forth in claim 4 wherein said means for shutting off one of said compartments comprises a slidable gate.

References Cited in the file of this patent

UNITED STATES PATENTS

| | | |
|---|---|---|
| 1,155,094 | Podlesak | Sept. 28, 1915 |
| 2,689,597 | Kinnear | Sept. 21, 1954 |
| 2,743,860 | Saxe | May 1, 1956 |
| 2,957,608 | Wahl | Oct. 25, 1960 |
| 3,035,739 | Berg | May 22, 1962 |